United States Patent [19]
Sunami et al.

[11] Patent Number: 5,716,110
[45] Date of Patent: Feb. 10, 1998

[54] BRAKE BOOSTER SYSTEM INCLUDING A POWER PISTON SLIDABLY SUPPORTED BY A RESILIENT CONVOLUTION CHAMBER AT ITS PERIPHERAL EDGE

[75] Inventors: Kazuo Sunami; Kenji Takeda; Mitsuo Inagaki, all of Nishio; Hiroyuki Shinkai, Kariya, all of Japan

[73] Assignees: Nippondenso Co., Ltd., Kariya; Nippon Soken, Inc., Nishio, both of Japan

[21] Appl. No.: 590,199

[22] Filed: Jan. 23, 1996

[30] Foreign Application Priority Data

Jan. 24, 1995 [JP] Japan ..................... 7-008978

[51] Int. Cl.[6] ................................ B60T 11/16
[52] U.S. Cl. ..................... 303/114.3; 92/98 D
[58] Field of Search ............. 303/113.3, 114.3; 92/98 D, 48, 96

[56] References Cited

U.S. PATENT DOCUMENTS

| | | | |
|---|---|---|---|
| 3,673,927 | 7/1972 | Fluhr | 92/98 D |
| 4,024,770 | 5/1977 | Liesenborghs | 92/98 D |
| 4,828,337 | 5/1989 | Wagner et al. | 303/114.3 |
| 4,966,429 | 10/1990 | Schiel et al. | 303/114.3 |
| 5,000,002 | 3/1991 | Belart | 303/114.3 |

FOREIGN PATENT DOCUMENTS

| | | | |
|---|---|---|---|
| 4010762 | 1/1991 | Germany | 303/114.3 |
| 4189665 | 7/1992 | Japan | 303/114.3 |
| 2253253 | 9/1992 | United Kingdom | 303/114.3 |

*Primary Examiner*—Matthew C. Graham
*Attorney, Agent, or Firm*—Cushman, Darby & Cushman IP Group of Pillsbury, Madison & Sutro LLP

[57] ABSTRACT

A housing of a brake booster 100 includes a pair of shells 1 and 5 and a ring 3 interposed therebetween which cooperatively define an interior space for accommodating a power piston 13. The interior space is divided into a front chamber 15 and a rear chamber 16 partitioned by the power piston 13. The power piston 13 has a diaphragm 2 interposed between the front chamber 15 and the rear chamber 16. The diaphragm 2 is shiftable in an axial direction thereof in response to pressure imbalance between the front chamber 15 and the rear chamber 16. A convolution chamber 2d is provided between an inner side of the housing and an outer peripheral edge of the diaphragm 2. The convolution chamber 2d is defined by a resilient annular member flattened in the axial direction and isolated from both the front chamber 15 and the rear chamber 16. The annular member elastically rolls along the inner side of the housing in response to pressure imbalance between the convolution chamber 2d and one of the front 15 and rear chambers 16. And, a port 28 is formed in the ring 3 to supply constant pressure into the convolution chamber 2b.

16 Claims, 3 Drawing Sheets

BRAKE BOOSTER SYSTEM INCLUDING A POWER PISTON SLIDABLY SUPPORTED BY A RESILIENT CONVOLUTION CHAMBER AT ITS PERIPHERAL EDGE

BACKGROUND OF THE INVENTION

1. Field of the Invention

This invention generally relates to a brake booster, and more particularly to a brake booster for automotive vehicles capable of preventing its diaphragm from being damaged.

2. Related Art

Among conventional brake boosters, there is an advanced brake booster having the capability of simply realizing an anti-skid effect by precisely changing pressure balance between a first and a second power chambers thereof in a way different from that of a general brake booster, as disclosed in Unexamined Japanese Patent application No. HEI 2-20461/1990, corresponding to the U.S. Pat. No. 4,966,420 issued Oct. 30, 1990.

According to such a conventional brake booster, a rolling diaphragm is provided around a diaphragm disc. If the pressure of the first power chamber becomes larger than that of the second power chamber during the anti-skid braking operation, the rolling diaphragm will be subjected to high pressure at one side (first chamber side) and low pressure at the other side (second chamber side). Receiving such different pressures at opposite surfaces, the shape of the rolling diaphragm will be possibly collapsed or largely deformed.

Collapse or deformation of the rolling diaphragm may result in damage of the diaphragm itself beginning from a portion such as a steep corner which is likely to receive a large concentrated force.

Furthermore, collapse or deformation of the rolling diaphragm may induce undesirable volume changes in the first and second power chambers, by increasing the volume of first power chamber and decreasing the volume of second power chamber. Such undesirable volume changes in the first and second power chambers will cause a significant delay in the response of the brake booster.

SUMMARY OF THE INVENTION

Accordingly, in view of above-described problems encountered in the related art, a principal object of the present invention is to provide an excellent brake booster having the capability of not only preventing the diaphragm from being damaged but eliminating any response delay even if two chambers partitioned by the power piston are filled with different pressures, and also to provide an arrangement of the diaphragm itself preferably applied to the excellent brake booster.

In order to accomplish this and other related objects, a first aspect of the present invention provides an excellent brake booster. A housing of the brake booster includes at least a pair of front and rear chambers partitioned by a power piston. The power piston has a diaphragm interposed between the front chamber and the rear chamber. The diaphragm is shiftable in an axial direction thereof in response to pressure imbalance between the front chamber and the rear chamber. A convolution chamber is provided at a peripheral edge of the diaphragm constituting the power piston. The convolution chamber is defined by an annular bag isolated from both the front chamber and the rear chamber.

According to features in a preferable mode of the present invention, the convolution chamber comprises a pair of convolution edges opposing in the axial direction. Or, the convolution chamber comprises inner and outer peripheral faces parallel to the axial direction and a pair of convolution edges connecting opposite ends of parallel peripheral faces. The convolution chamber can be constituted by peripheral edges of a pair of opposing diaphragm members which cooperatively constitute the diaphragm. Furthermore, a surface of the diaphragm is covered by a cover member, and the cover member has an end portion extending along an inner surface of the housing. And, the end portion of the cover member has a distal end being bent inward.

A second aspect of the present invention provides a brake booster system for an automotive vehicle. A brake booster in this system has a housing including at least a pair of front and rear chambers partitioned by a power piston. The front chamber is communicated with a first switching valve, and the rear chamber is communicated with a second switching valve. Each of the first and second switching valves has an input port selectively connectable to atmosphere or a negative pressure source in an internal combustion engine of the automotive vehicle. A speed sensor is provided to detect a skid condition of wheels of the automotive vehicle. A controller inputs a signal obtained from the speed sensor and actuates the first and second switching valves in accordance with the signal so as to realize an anti-skid operation of the wheels. The power piston has a diaphragm interposed between the front chamber and the rear chamber. The diaphragm is shiftable in an axial direction thereof in response to pressure imbalance between the front chamber and the rear chamber. And, a convolution chamber is provided at a peripheral edge of the diaphragm constituting the power piston. The convolution chamber is maintained at atmospheric pressure irrespective of pressure change in the front chamber and the rear chamber.

According to features in the preferred mode of the present invention, a shift movement of the power piston is transmitted as an assist force or a reaction force to an output rod of the brake booster.

A third aspect of the present invention further provides an excellent brake booster. A housing of this brake booster includes a pair of front and rear chambers partitioned by a power piston. The power piston has a diaphragm interposed between the front chamber and the rear chamber. The diaphragm is shiftable in an axial direction thereof in response to pressure imbalance between the front chamber and the rear chamber. A convolution chamber is provided between an inner side of the housing and an outer peripheral edge of the diaphragm constituting the power piston. The convolution chamber is defined by an annular bag isolated from both the front chamber and the rear chamber. And, the annular bag causes an elastic rolling motion along the inner side of the housing in response to pressure imbalance between the convolution chamber and one of the front and rear chambers, without changing the shape of the convolution chamber.

Yet further, a fourth aspect of the present invention provides an excellent brake booster. A housing of this brake booster includes at least a pair of front and rear shells and a central ring interposed between the front and rear shells. The front and rear shells and the central ring cooperatively define an interior space for accommodating a power piston. The interior space is divided into a front chamber and a rear chamber partitioned by the power piston. The power piston has a diaphragm interposed between the front chamber and the rear chamber. The diaphragm is shiftable in an axial direction thereof in response to pressure imbalance between the front chamber and the rear chamber. A convolution chamber is provided between an inner side of the housing and an outer peripheral edge of the diaphragm constituting the power piston. The convolution chamber is defined by an annular air bag flattened in the axial direction and isolated from both the front chamber and the rear chamber. The annular air bag is elastically rollable along the inner side of the housing in response to pressure imbalance between the convolution chamber and one of the front and rear chambers. And, a port is formed in the central ring to supply constant pressure into the convolution chamber.

According to further features in the preferred mode of the present invention, the annular air bag defining the convolution chamber is constituted by a resilient member integrally formed with the diaphragm, the resilient member has a pair of outer peripheral beads, one peripheral bead being fixed between the front shell and a front side of the central ring and the other peripheral bead being fixed between the rear shell and a rear side of the central ring.

The annular air bag defining the convolution chamber includes front and rear convolution edges opposing in the axial direction and parallel inner and outer peripheral faces extending in the axial direction. The inner peripheral face shifts in the axial direction and then changes into the outer peripheral face by causing a turn at one of the convolution edges in accordance with a shift movement of the power piston, while the outer peripheral face changes into the inner peripheral face by causing a turn at the other convolution edge.

The power piston further comprises a cover covering a surface of the diaphragm, the cover is elongated beyond the outer peripheral edge of the diaphragm and bonded onto the surface of the inner peripheral face of the annular air bag.

The cover has a distal end bent inward off the inner peripheral face if the air bag. The port formed in the central ring communicate with atmosphere.

As described above, in accordance with the present invention, the convolution chamber provided in the brake booster is maintained at a constant pressure (e.g. atmospheric pressure) and smoothly causes the rolling movement along the inner side of the booster housing in accordance with a shift movement of the diaphragm without collapsing or deforming the shape of the convolution chamber. Thus, it becomes possible to provide an excellent brake booster having the capability of not only preventing the diaphragm from being damaged but eliminating any response delay even if two chambers partitioned by the power piston are filled with different pressures, and also to provide a novel arrangement of the diaphragm preferably applied to such a brake booster.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
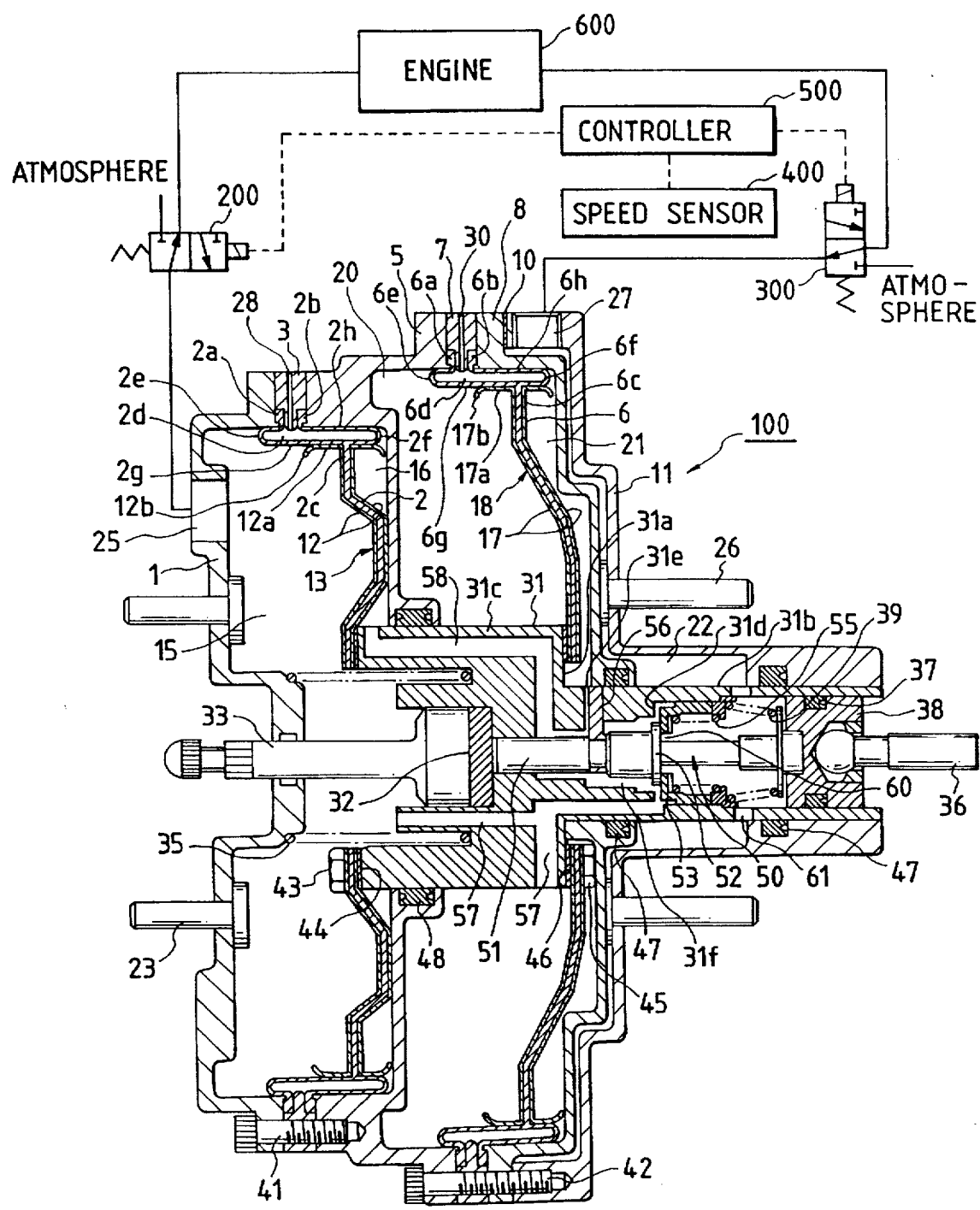
FIG. 1 is a block diagram showing an overall arrangement of a brake booster system in accordance with a first embodiment of the present invention.

Preferred embodiments of the present invention will be explained in greater detail hereinafter, with reference to the accompanying drawings. Identical parts are denoted by identical reference numerals throughout views.

FIG. 1 shows a tandem brake booster system in accordance with a first embodiment of the present invention. A housing of a brake booster 100 comprises a front shell 1, a front ring 3, a central shell 5, a rear ring 7, a separation wall 8, and a rear shell 11. The front shell 1, which is configured into a cylindrical shallow drum shape, has a front face (bottom portion) connected to a master cylinder (not shown) disposed in front the housing of the brake booster 100. The front ring 3 is airtightly engaged with the rearmost end flange (i.e. right end) of the front shell 1 through a front outer peripheral bead 2a of a front diaphragm 2. The central shell 5, which is a cylindrical element having a partition wall required to constitute the brake booster 100 as a tandem type, is airtightly engaged with the rear end of the front ring 3 through a rear outer peripheral bead 2b of the front diaphragm The rear ring 7 is airtightly engaged with the rearmost end flange (i.e. right end) of the central shell 5 through a front outer peripheral bead 6a of a rear diaphragm 6. The separation wall 8, which is configured into a cylindrical, stepped, shallow drum shape, is airtightly engaged with the rear end of the rear ring 7 through a rear outer peripheral bead 6b of the rear diaphragm 6. And, the rear shell 11, which is securely fixed to a dash board (not shown) of an automotive vehicle, is airtightly engaged with the rear end surface of separation wall 8 through a seal member 10.

Front shell 1, central shell 5, rear shell 11, front ring 3, rear ring 7, and separation wall 8 are integrally fixed together by means of fastening bolts 41 and 42.

A front interior space, defined by front shell 1, front ring 3 and a front half of central shell 5, is divided into a first chamber 15 and a second chamber 16 by a circular front power piston 13. The front power piston 13 consists of a front diaphragm 2 and covers 12 integrally bonded on the opposite surfaces of the front diaphragm 2, so that the opposite surfaces of the front diaphragm 2 are completely covered by the covers 12.

A rear interior space, defined by a rear half of central shell 5, rear ring 7 and separation wall 8, is divided into a third chamber 20 and a fourth chamber 21 by a circular rear power piston 18. The rear power piston 18 consists of a rear diaphragm 6 and covers 17 integrally bonded on the opposite surfaces of the rear diaphragm 6, so that the opposite surfaces of the rear diaphragm 6 are completely covered by the covers 17.

Furthermore, a fifth chamber 22 is defined between separation wall 8 and rear shell 11.

A plurality of bolts 23, each extending forward (left), are provided on the front face of front shell 1 to assemble the brake booster 100 with the master cylinder (not shown). Through a first port 25 provided on the front shell 1, the first chamber 15 is airtightly connected to a first switching valve 200.

In the same manner, the rear shell 11 is provided with a plurality of bolts 26 each extending rearward (i.e. right) by which the brake booster 100 is fixedly installed on a vehicle body (i.e. dash board). Through a second port 27 provided on the rear shell 11, the fifth chamber 22 is airtightly connected to a second switching valve 300.

Between an outer peripheral end 2c of the front diaphragm 2 and each of outer peripheral beads 2a and 2b, there is provided a front convolution chamber 2d which is preferably a thin doughnut hollow space flattened in an axial direction of the brake booster 100 along the inner circular surface of the housing (i.e. inner circular surfaces of front shell 1, front ring 3 and central shell 5). The convolution chamber 2d, which is defined by a sort of resilient air bag, is airtightly isolated from both of the first and second chambers 15 and 16. In fabricating the front diaphragm 2, the front convolution chamber 2d and outer peripheral beads 2a, 2b are integrally fabricated together with the front diaphragm 2. More specifically, the resilient member defining the front convolution chamber 2d comprises a pair of, i.e. front and rear, convolution edges 2e and 2f opposing in the axial direction of brake booster 100, and parallel inner and outer peripheral faces 2g and 2h extending in the axial direction of the brake booster 100.

The cover 12 covering each surface of the front diaphragm 2 is elongated beyond the outer peripheral end 2c of the front diaphragm 2, so that the outermost end 12a of each cover 12 extends along the inner peripheral face 2g in parallel to the inner circular surface of the housing. The surface of outermost end 12a of each cover 12 is bonded onto the inner peripheral face 2g. Thus, the outermost end 12a of each cover 12 reinforces the inner peripheral face 2g of the resilient annular member defining the front convolution chamber 2d.

The outermost end 12a of each cover 12 is further bent inward at its distal end 12b, so as to prevent the distal end 12b of each cover 12 from damaging the inner peripheral face 2g of the resilient annular member defining the front convolution chamber 2d.

In the same manner, between an outer peripheral end 6c of the rear diaphragm 6 and each of outer peripheral beads 6a and 6b, there is provided a rear convolution chamber 6d which is preferably a thin doughnut space flattened in the axial direction of the brake booster 100 along the inner circular surface of the housing (inner circular surfaces of central shell 5, rear ring 7 and separation wall 8). The rear convolution chamber 6d, which is defined by a sort of resilient air bag, is airtightly isolated from both of the third and fourth chambers 20 and 21. In fabricating the rear diaphragm 8, the rear convolution chamber 8d and outer peripheral beads 8a, 8b are integrally fabricated together with the rear diaphragm 8. More specifically, the resilient annular member defining the rear convolution chamber 8d comprises a pair of, i.e. front and rear, convolution edges 6e and 6f opposing in the axial direction of brake booster 100, and parallel inner and outer peripheral faces 6g and 6f extending in the axial direction of the brake booster 100.

The cover 17 covering each surface of the rear diaphragm 6 is elongated beyond the outer peripheral end 6c of the rear diaphragm 6, so that the outermost end 17a of each cover 17 extends along the inner peripheral face 6g in parallel to the inner circular surface of the housing. The surface of outermost end 17a of each cover 17 is bonded onto the inner peripheral face 6g. Thus, the outermost end 17a of each cover 17 reinforces the inner peripheral face 6g of the resilient annular member defining the rear convolution chamber 6d.

The outermost end 17a of each cover 17 is further bent inward at its distal end 17b, so as to prevent the distal end 17b from damaging the inner peripheral face 6g of the resilient annular member defining the convolution chamber 6d.

The front and rear convolution chambers 2d and 6d communicate with atmosphere via a third port 28 and a fourth port 30 provided on the front ring 3 and the rear ring 7, respectively.

A stepped cylindrical piston 31, provided in the center of the brake booster 100, has a front end connected to the inner end of front power piston 13 airtightly through a seal member 44 by means of a bolt 43 and a shoulder portion connected to the inner end of rear power piston 18 airtightly through a seal member 46 by means of a bolt 45.

At a small-diameter portion 31b, the piston 31 is inserted into the inner bores of the separation wall 8 and the rear shell 11 through two seal members 47, 47.

At a large-diameter portion 31c, the piston 31 is inserted into the inner bore of the central shell 5 through a seal member 48. The presence of above-described three seal members 47, 47 and 48 makes it possible for the piston 31 to airtightly slide in each chamber of the housing.

The large-diameter portion 31c of the piston 31 has an inside bore open to the front in which a reaction disk 32 and an output rod 33 are accommodated. The output rod 33 is engaged with a piston (not shown) of the master cylinder (not shown).

A spring 35 is interposed between the piston 31 and the front shell 1; therefore, the piston 31 is urged rearward by a resilient force of the spring 35.

The small-diameter portion 31b of the piston 31 has an inside bore open to the rear in which a side piston 38 is slidably inserted. The side piston 38 has an inside bore accommodating an input rod 38 therein and an outer surface provided with a seal member 37 airtightly sealing the fifth chamber 22.

In front of the side piston 38, there is provided a valve mechanism 50 with a spring 39 intervening therebetween. The valve mechanism 50 comprises a skirt 52 of a valve plunger 51, a cylindrical valve 53, and a spring 55 urging the cylindrical valve 53 forward. The cylindrical valve 53, assembled in the inside bore of the small-diameter portion 31b, is coaxial with the valve plunger 51 and is resiliently pushed forward by the spring 55. In response to an axial movement of the input rod 36, the cylindrical valve 53 is selectively engageable with the skirt 52 of the valve plunger 51 or a step 31d formed in the inside bore of the small-diameter portion 31b of piston 31.

Furthermore, the valve plunger 51 in the valve mechanism 50 is responsive to each depression of a brake pedal (not shown). Namely, a depressing force of the brake pedal (not shown) is transmitted through the input rod 38 and the side piston 38 to the valve plunger 51 which is slidable in the piston 31 along the axial direction thereof. Moreover, the valve plunger 51 is positioned at its home or initial position by being engaged with a stopper 56 inserted into a slit 31e provided in the small-diameter portion 31b of piston 31.

Operation of the above-described valve mechanism 50 will be explained hereinafter. When the brake pedal (not shown) is not depressed, the cylindrical valve 53 is engaged with the skirt 52 of the valve plunger 51 and is separated from the step 31d formed in the inside bore of the small-diameter portion 31b. In this condition, first chamber 15 through fourth chamber 21 are communicated each other via a first passage 57, a piston inner bore 31f, slit 31e, and a second passage 58, while the fifth chamber 22 is isolated from these first 15 through fourth chamber 21.

On the other hand, when the brake pedal (not shown) is depressed, the cylindrical valve 53 is engaged with the step 31d formed in the inside bore of the small-diameter portion 31b and is separated from the skirt 52 of the valve plunger 51. In this condition, second chamber 18 and fourth chamber 21 are communicated with fifth chamber 22 via second passage 58, piston inner bore 31f, an inner bore 60 of the cylindrical valve 53, slit 31e, and a third passage 61. Meanwhile, first chamber 15 and third chamber 20, which always communicate each other through first passage 57, are isolated from other chambers since the cylindrical valve 53 is airtightly brought into contact with the step 31d.

The first switching valve 200 has one input port connectable to atmosphere and the other input port connectable to an intake passage of an internal combustion engine 600 of the automotive vehicle in order to selectively supply atmospheric pressure or negative pressure to the first chamber 15. Negative pressure is obtained from a portion downstream of a throttle valve provided in the intake passage of the internal combustion engine 600 when the engine 600 is in start-up and low-load conditions. The first switching valve 200 is ordinarily positioned at its home position where negative pressure is introduced into the first chamber 15.

The second switching valve 300 is also connected to the internal combustion engine 600 at one input port and atmosphere at the other input port to selectively supply negative pressure or atmospheric pressure to the fifth chamber 22, and is usually positioned at its home position where atmospheric pressure is introduced into the fifth chamber 22.

A controller 500 receives an input signal representing a vehicle wheel speed detected by a speed sensor 400, and activates a solenoid provided in each of the first and second switching valves 200 and 300 in accordance with the detected speed.

Next, operation of the brake booster in accordance with the first embodiment of the present invention will be explained. When the brake pedal is depressed, the input rod 36 shifts forward (left in the drawing). In response to this shift movement, the cylindrical valve 53 is separated from the skirt 53 of the valve plunger 51 and brought into contact with the inner-bore step 31d by a resilient force of the spring 55.

In this instance, the first switching valve 200 is positioned at its home position where negative pressure is introduced into the first chamber 15, and the second switching valve 300 is positioned at its home position where atmospheric pressure is introduced into the fifth chamber 22. Hence, the first chamber 15, serving as a front chamber of the front power piston 13, is filled with negative pressure air supplied through the first port 25 from the first switching valve 200. The third chamber 20, serving as a front chamber of the rear power piston 18, is also filled with negative pressure air supplied through the first passage 57 from the first chamber 15.

Meanwhile, the second chamber 16, serving as a rear chamber of the front power piston 13, is filled with atmospheric pressure air introduced through second port 27, fifth chamber 22, third passage 61, inner bore 60 of cylindrical valve 53, piston inner bore 31f, and second passage 58. The fourth chamber 21, serving as a rear chamber of the rear power piston 18, is filled with atmospheric pressure air introduced through second port 27, fifth chamber 22, third passage 61, inner bore 60 of cylindrical valve 53, piston inner bore 31f, and slit 31e.

With this control, each of power pistons 13 and 18 is subjected to negative pressure acting from its front chamber and atmospheric pressure acting from its rear chamber. Due to difference of these front and rear pressures, each of power pistons 13 and 18 causes a shift movement in the forward direction along its axis. Such a cooperative shift movement of tandem power pistons 13 and 18 gives a shifting force to the piston 31 which is securely fixed to these power pistons 13 and 18 by means of volts 43 and 45. This shifting force applied to the piston 31 acts as an assist force for moving the piston 31 in the forward direction in response to a manual braking force applied on the input rod 36. A summation of the manual braking force inputted from the input rod 36 and the assist force thus generated by tandem power pistons 13 and 18 is applied to the master cylinder (not shown) to generate a boosted braking hydraulic pressure.

In this case, front and rear convolution chambers 2d and 6d are filled with atmospheric pressure air introduced through third and fourth ports 28 and 30, respectively. On the other hand, as described above, the first and third chambers 15 and 20 are filled with negative pressure air. Thus, a significant amount of pressure difference is generated between first chamber 15 and front convolution chamber 2d, and also between third chamber 20 and rear convolution chamber 6d. With this pressure difference (pressure imbalance), each of resilient annular member defining the convolution chambers 2d and 6d smoothly advances forward causing a rolling motion along the inner side of the booster housing in accordance with the forward shift movement of the power pistons 13 and 18.

Figure 2A:
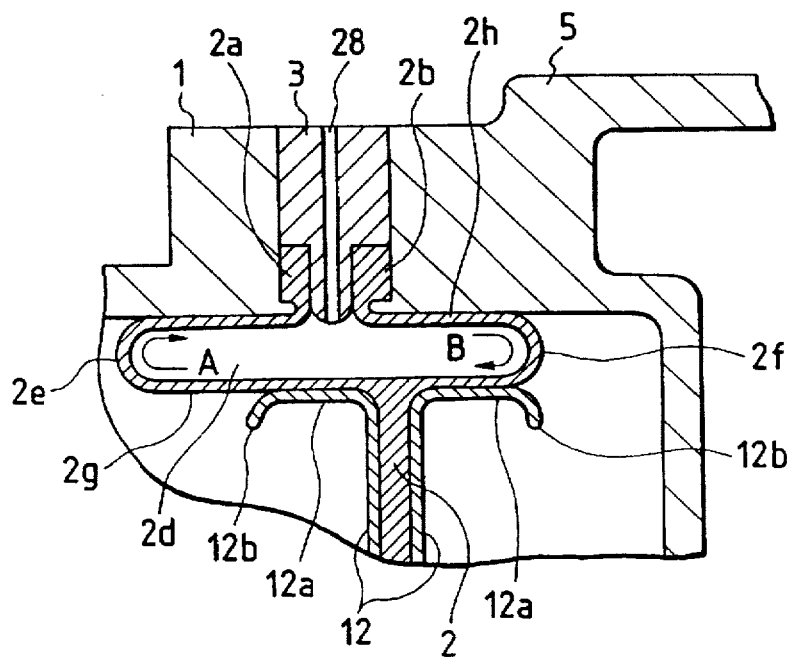
FIGS. 2A and 2B are enlarged views illustrating the function of a convolution chamber in accordance with the first embodiment of the present invention.

More specifically, the rolling motion of respective resilient annular members defining front and rear convolution chambers 2d and 6d is generated in the following manner. In response to the pressure imbalance caused against first chamber 15, the inner peripheral face 2g of front convolution chamber 2d moves forward and then gradually and smoothly changes into the outer peripheral face 2h by causing a turn as shown by an arrow "A" in FIG. 2A at its front convolution edge 2e which is always formed at the front end of the front convolution chamber 2d due to elasticity of the resilient member defining the front convolution chamber 2d. In response to such a forward movement of inner peripheral face 2g, the outer peripheral face 2h of front convolution chamber 2d gradually and smoothly changes into the inner peripheral face 2g by causing a turn as shown by an arrow "B" in FIG. 2A at its rear convolution edge 2f which is always formed at the rear end of the convolution chamber 2d due to elasticity.

Figure 2B:
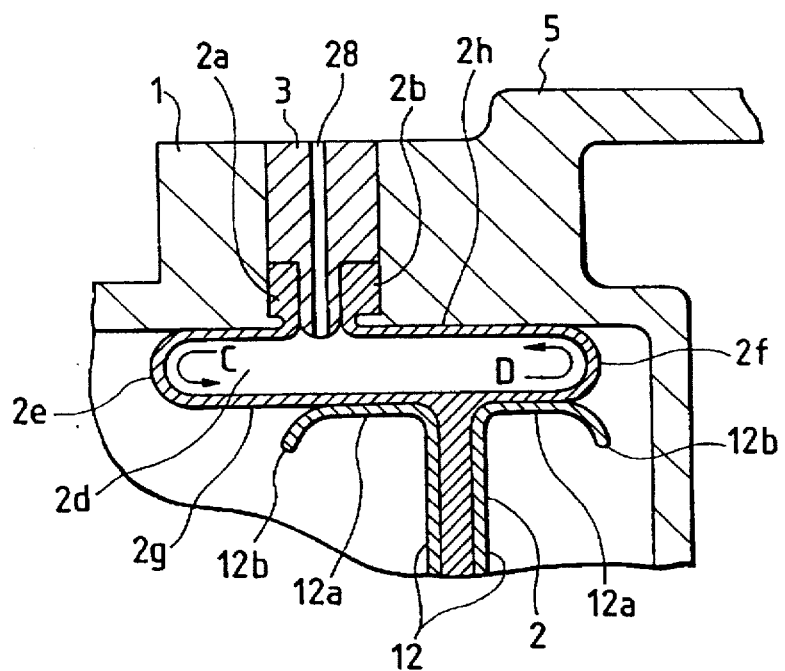

Similarly, in response to the pressure imbalance caused against third chamber 20, the inner peripheral face 6g of rear convolution chamber 6d moves forward and then gradually and smoothly changes into the outer peripheral face 6h by causing a turn as shown by an arrow "C" in FIG. 2B at its front convolution edge 6e being always formed at the front end of the rear convolution chamber 6d due to elasticity of the resilient member defining the rear convolution chamber 6d. In response to the forward movement of the inner peripheral face 6g, the outer peripheral face 6h of rear convolution chamber 6d gradually and smoothly changes into the inner peripheral face 6g by causing a turn as shown by an arrow "D" in FIG. 2B at its rear convolution edge 6f being always formed at the rear end of the rear convolution chamber 6d due to elasticity.

Accordingly, each of diaphragm 2 and 6 smoothly moves forward along the axis thereof without collapsing convolution chambers 2d and 6d, assuring that neither the diaphragm itself nor convolution chamber itself is damaged. Furthermore, causing no deformation in respective convolution chambers 2d and 6d is effective to eliminate any delay in the response of the brake booster 100 which is possibly derived from the unexpected volume change of chambers 15, 16, 20 and 21.

The covers 12 and 17 covering opposite surfaces of the diaphragms 2 and 6 are bent perpendicularly in the region of their outermost ends 12a and 17a along the inner circular surface of the housing, and the outermost ends 12a and 17a are securely bonded onto the surfaces of the inner peripheral faces 2g and 6g of the convolution chambers 2d and 6d, respectively. Such an arrangement is so advantageous in reinforcing the inner peripheral faces 2g and 6g that substantially no deformation is generated in the axially flattened doughnut (or annulus ring) shape of each convolution chamber 2d or 6d when these convolution chambers 2d and 6d move forward in proportion to the shift movement of power pistons 13 and 18.

Furthermore, the outermost ends 12a and 17a of respective covers 12 and 17 are bent inward at their distal ends 12b and 17b. Such an arrangement is effective to prevent the distal ends 12b and 17b of respective covers 12 and 17 from damaging the inner peripheral faces 2g and 6g of front and rear convolution chambers 2d and 6d when the power pistons 13 and 18 move in the forward direction along the axis thereof.

Next, an anti-skid operation performed by the brake booster 100 will be explained. When a braking force is excessively large compared with an adequate value which should be determined based on a given frictional coefficient (μ) of the road, each vehicle wheel will lock itself and cause a skid. To release such a locking or skidding phenomenon, the brake booster 100 performs the following anti-skid operation.

When the speed sensor 400 detects the tendency of vehicle wheels locking themselves, the controller 500 activates the first switching valve 200 in response to the detection signal obtained from the speed sensor 400. Namely, the solenoid of the first switching valve 200 is energized to change the input port of first switching valve 200 from negative pressure to atmospheric pressure. Thus, atmospheric pressure air is introduced into the first chamber 15 and the third chamber 20 which is always communicated with the first chamber 15.

At the same time, the controller 500 activates the solenoid of second switching valve 300, thereby changing the input port of second switching valve 300 from atmospheric pressure to negative pressure. Thus, negative pressure is introduced into fifth chamber 22, second chamber 16 and fourth chamber 21 mutually communicating with each other.

With this control, the pressure condition of front and rear chambers of respective power pistons 13 and 18 is changed reversely. The front power piston 13 is subjected to positive pressure acting from first chamber 15 and negative-pressure acting from second chamber 16. The rear power piston 18 is subjected to positive pressure acting from third chamber 20 and negative pressure acting from fourth chamber 21.

This pressure condition causes tandem power pistons 13 and 18 to generate a reaction force against the manual braking force entered through input rod 36. Due to imbalance between front and rear pressures, each of power pistons 13 and 18 causes a shift movement in the rearward direction along its axis. Such a cooperative shift movement of tandem power pistons 13 and 18 gives a shifting force to the piston 31 which is securely fixed to these power pistons 13 and 18 by means of volts 43 and 45. This shifting force applied to the piston 31 acts as a reaction force for pressing the piston 31 back in the rearward direction against the manual braking force applied on the input rod 36. A force equivalent to subtraction between the manual braking force inputted from the input rod 36 and the reaction force thus generated by tandem power pistons 13 and 18 is applied to the master cylinder (not shown) to generate a-reduced braking hydraulic pressure, thereby preventing the vehicle wheels from self-locking or skidding.

In this case, front and rear convolution chambers 2d and 6d are filled with atmospheric pressure air introduced through third and fourth ports 28 and 30, respectively. On the other hand, as described above, the second and fourth chambers 16 and 21 are filled with negative pressure air. Thus, a significant amount of pressure difference is generated between second chamber 16 and front convolution chamber 2d, and also between fourth chamber 21 and rear convolution chamber 6d. With this pressure difference (imbalance), each of convolution chambers 2d and 6d smoothly advances rearward causing a rolling motion along the inner side of the booster housing in accordance with the rearward shift movement of the power pistons 13 and 18.

More specifically, the rolling motion of respective resilient annular member defining front and rear convolution chambers 2d and 6d is generated in the following manner. In response to the pressure imbalance caused against second chamber 16, the inner peripheral face 2g of front convolution chamber 2d moves rearward and then gradually and smoothly changes into the outer peripheral face 2h by causing a turn at its rear convolution edge 2f which is always formed at the rear end of the front convolution chamber 2d due to elasticity of the resilient member defining the front convolution chamber 2d. In response to such a rearward movement of inner peripheral face 2g, the outer peripheral face 2h of front convolution chamber 2d gradually and smoothly changes into the inner peripheral face 2g by causing a turn at its front convolution edge 2e which is always formed at the front end of the convolution chamber 2d due to elasticity.

Similarly, in response to the pressure imbalance caused against fourth chamber 21, the inner peripheral face 6g of rear convolution chamber 6d moves rearward and then gradually and smoothly changes into the outer peripheral face 6h by causing a turn at its rear convolution edge 6f being always formed at the rear end of the rear convolution chamber 6d due to elasticity of the resilient member defining the rear convolution chamber 6d. In response to the rearward movement of the inner peripheral face 6g, the outer peripheral face 6h of rear convolution chamber 6d gradually and smoothly changes into the inner peripheral face 6g by causing a turn at its front convolution edge 6e being always formed at the front end of the rear convolution chamber 6d due to elasticity.

Accordingly, each of diaphragm 2 and 6 smoothly moves rearward along the axis thereof without collapsing convolution chambers 2d and 6d, assuring that neither the diaphragm itself nor convolution chamber itself is damaged. Furthermore, causing no deformation in respective convolution chambers 2d and 6d is effective to eliminate any delay in the response of the brake booster 100 which is possibly derived from the unexpected volume change of chambers 15, 16, 20 and 21.

The covers 12 and 17 covering opposite surfaces of the diaphragms 2 and 6 are bent perpendicularly in the region of their outermost ends 12a and 17a along the inner circular surface of the housing, and the outermost ends 12a and 17a are securely bonded onto the surfaces of the inner peripheral faces 2g and 6g of the convolution chambers 2d and 6d, respectively. Such an arrangement is so advantageous in reinforcing the inner peripheral faces 2g and 6g that substantially no deformation is generated in the axially flattened doughnut (or annulus ring) shape of each convolution chamber 2d or 6d when these convolution chambers 2d and 6d move rearward in proportion to the shift movement of power pistons 13 and 18.

Furthermore, the outermost ends 12a and 17a of respective covers 12 and 17 are bent inward at their distal ends 12b and 17b. Such an arrangement is effective to prevent the distal ends 12b and 17b of respective covers 12 and 17 from damaging the inner peripheral faces 2g and 6g of front and rear convolution chambers 2d and 6d when the power pistons 13 and 18 move in the rearward direction along the axis thereof.

If the speed sensor 400 detects the recovery of vehicle wheels from the locking condition, the controller 500 deactivates first switching valve 200 and second switching valve 300 in response to the detection signal obtained from the speed sensor 400. Namely, the solenoid of first switching valve 200 returns the input port to its home position (negative pressure port), and the solenoid of second switching valve 300 returns the input port to its home position (atmospheric pressure port), thereby generating again an assisting force applied to the piston 31 for boosting the braking force transmitted to the master cylinder (not shown).

The anti-skid operation of the brake booster 100 is carried out by alternately repeating the brake force boosting and the reducing controls in the manner described above.

Although the above-described first embodiment applied the present invention to a tandem brake booster, it is needless to say that the present invention can be equally applied to any other brake booster, such as a single brake booster.

Figure 3:
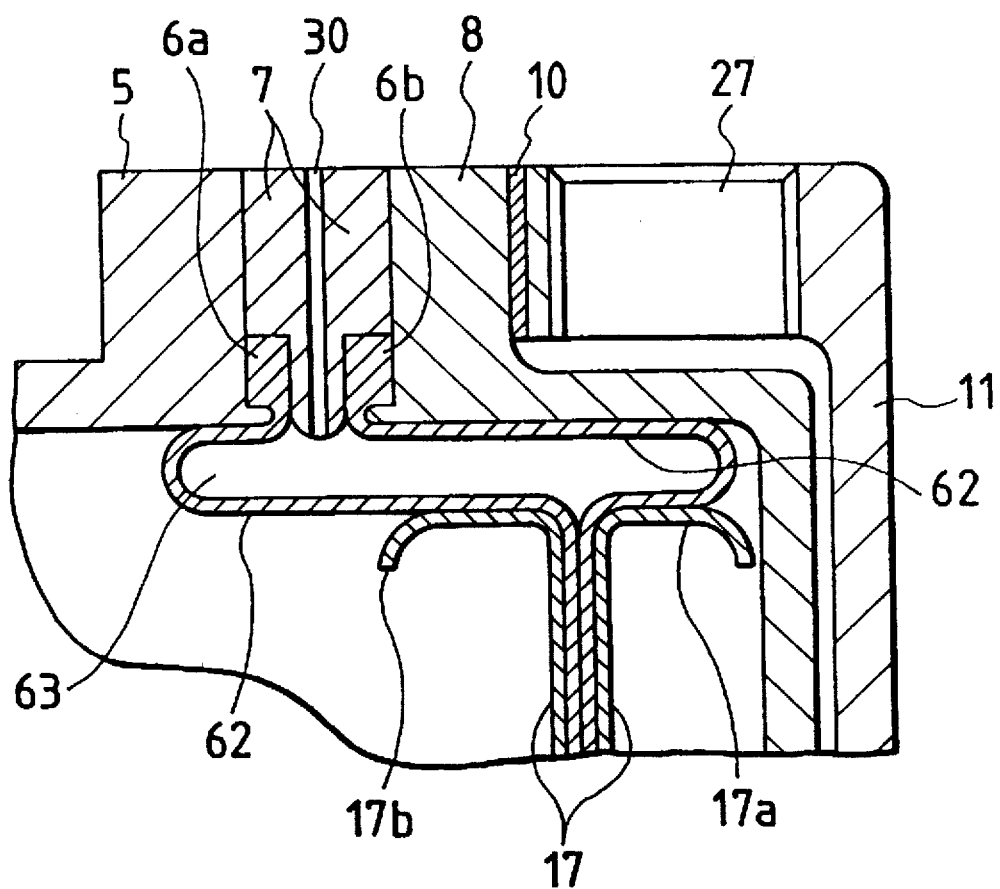
FIG. 3 is an enlarged view showing the structure of a convolution chamber in accordance with a second embodiment of the present invention.

Next, a second embodiment of the present invention will be explained with reference to FIG. 3. The second embodiment is different from the above-described first embodiment in that a pair of opposing diaphragms 62 and 62 constitutes a convolution chamber 63 at their peripheral edges. More specifically, opposing diaphragms 62 and 62 are bonded together at their central portions to constitute a thick diaphragm part, but their peripheral edges are separated from each other to form an air bag defining convolution chamber 63.

Although the second embodiment only shows the arrangement of rear convolution chamber 63, it is needless to say that the similar arrangement can be applied to the front convolution chamber. Other structural features are identical with those of the first embodiment.

According to the second embodiment, the brake booster operates in the same way as the first embodiment, and brings the same effect as the first embodiment.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A brake booster comprising:
   a housing including at least a pair of front and rear chambers partitioned by a power piston, at least one of said front and rear chambers selectively introducing a negative pressure;
   said power piston having a diaphragm interposed between said front chamber and said rear chamber, said diaphragm being shiftable in an axial direction thereof in response to pressure imbalance between said front chamber and said rear chamber; and
   a convolution chamber provided at a peripheral edge of said diaphragm constituting said power piston, said convolution chamber being defined by an annular bag isolated from both said front chamber and said rear chamber, said annular bag axially overhanging both of said front and rear chambers and being maintained at an atmospheric pressure irrespective of any pressure change in said front and rear chambers.

2. The brake booster defined by claim 1, wherein said convolution chamber comprises a pair of convolution edges opposing in said axial direction.

3. The brake booster defined by claim 1, wherein said convolution chamber comprises inner and outer peripheral faces parallel to said axial direction and a pair of convolution edges opposing in said axial direction.

4. The brake booster defined by claim 1, wherein said convolution chamber is constituted by peripheral edges of a pair of opposing diaphragm members which cooperatively constitute said diaphragm.

5. The brake booster defined by claim 1, wherein a surface of said diaphragm is covered by a cover member, and said cover member has an end portion extending parallel with an inner surface of said housing.

6. The brake booster defined by claim 5, wherein said end portion of said cover member has a distal end being bent inward.

7. A brake booster system for an automotive vehicle comprising:
   a brake booster having a housing including at least a pair of front and rear chambers partitioned by a power piston;
   said front chamber being communicated with a first switching valve, and said rear chamber being communicated with a second switching valve;
   said first and second switching valves respectively having an input port selectively connectable to atmosphere or a negative pressure source in an internal combustion engine of said automotive vehicle;
   a speed sensor detecting a skid condition of wheels of said automotive vehicle;
   a controller inputting a signal obtained from said speed sensor and actuating said first and second switching valves in accordance with said signal so as to realize an anti-skid operation of said wheels;
   said power piston having a diaphragm interposed between said front chamber and said rear chamber, said diaphragm being shiftable in an axial direction thereof in response to pressure imbalance between said front chamber and said rear chamber; and
   a convolution chamber provided at a peripheral edge of said diaphragm constituting said power piston, said convolution chamber being maintained at atmospheric pressure irrespective of pressure change in said front chamber and said rear chamber.

8. The brake booster system defined by claim 7, wherein a shift movement of said power piston is transmitted as an assist force or a reaction force to an output rod of said brake booster.

9. A brake booster comprising:
   a housing including a pair of front and rear chambers partitioned by a power piston, at least one of said front and rear chambers selectively introducing a negative pressure;
   said power piston having a diaphragm interposed between said front chamber and said rear chamber, said diaphragm being shiftable in an axial direction thereof in response to pressure imbalance between said front chamber and said rear chamber; and
   a convolution chamber provided between and inner side of said housing and an outer peripheral edge of said diaphragm constituting said power piston, said convolution chamber being defined by an annular bag isolated from both said front chamber and said rear chamber, and said annular bag causing an elastic rolling motion along the inner side of said housing in response to pressure imbalance between said convolution chamber and one of said front and rear chambers, without changing the shape of said convolution chamber, and said annular bag axially overhanging both of said front and rear chambers and being maintained at an atmospheric pressure irrespective of any pressure change in said front and rear chambers.

10. A brake booster comprising:

a housing including at least a pair of front and rear shells and a central ring interposed between said front and rear shells, said front and rear shells and said central ring cooperatively defining an interior space for accommodating a power piston;

said interior space being divided into a front chamber and a rear chamber partitioned by said power piston, at least one of said front and rear chambers selectively introducing a negative pressure;

said power piston having a diaphragm interposed between said front chamber and said rear chamber, said diaphragm being shiftable in an axial direction thereof in response to pressure imbalance between said front chamber and said rear chamber;

a convolution chamber provided between an inner side of said housing and an outer peripheral edge of said diaphragm constituting said power piston, said convolution chamber being defined by an annular air bag flattened in said axial direction and isolated from both said front chamber and said rear chamber;

said annular air bag axially overhanging both of said front chamber and said rear chamber and being elastically rollable along said axial direction in response to pressure imbalance between said convolution chamber and one of said front and rear chambers; and a port formed in said central ring to supply air into said convolution chamber, so that sad annular bag is maintained at an atmospheric pressure irrespective of any pressure change in said front and rear chambers.

11. The brake booster defined by claim 10, wherein said port formed in said central ring communicates with atmosphere.

12. A brake booster comprising:

a housing including at least a pair of front and rear shells and a central ring interposed between said front and rear shells, said front and rear shells and said central ring cooperatively defining an interior space for accommodating a power piston;

said interior space being divided into a front chamber and a rear chamber partitioned by said power piston;

said power piston having a diaphragm interposed between said front chamber and said rear chamber, said diaphragm being shiftable in an axial direction thereof in response to pressure imbalance between said front chamber and said rear chamber;

a convolution chamber provided between an inner side of said housing and an outer peripheral edge of said diaphragm constituting said power piston, said convolution chamber being defined by an annular air bag flattened in said axial direction and isolated from both said front chamber and said rear chamber;

said annular air bag being elastically rollable along said axial direction in response to pressure imbalance between said convolution chamber and one of said front and rear chambers; and a port formed in said central ring to supply a constant pressure into said convolution chamber, wherein said annular air bag defining said convolution chamber is constituted by a resilient member integrally formed with said diaphragm, said resilient member has a pair of outer peripheral beads, one peripheral bead being fixed between said front shell and a front side of said central ring and the other peripheral bead being fixed between said rear shell and a rear side of said central ring.

13. The brake booster defined by claim 12, wherein said annular air bag defining said convolution chamber includes front and rear convolution edges opposing in said axial direction and parallel inner and outer peripheral faces extending in said axial direction.

14. The brake booster defined by claim 13, wherein said power piston further comprises a cover covering a surface of said diaphragm, said cover is elongated beyond the outer peripheral edge of said diaphragm and bonded onto the surface of said inner peripheral face of said annular air bag.

15. The brake booster defined by claim 14, wherein said cover has a distal end bent inward of said inner peripheral face of said annular air bag.

16. The brake booster defined by claim 13, wherein said inner peripheral face shifts in said axial direction and then changes into said outer peripheral face by causing a turn at one of said convolution edges in accordance with a shift movement of said power piston, while said outer peripheral face changes into said inner peripheral face by causing a turn at the other convolution edge.

* * * * *